United States Patent [19]

Tanner et al.

[11] 4,097,894
[45] Jun. 27, 1978

[54] SECURED SCRAMBLE DECODER FILTER

[75] Inventors: James L. Tanner, Reseda; Bruno A. Rist, Northridge; George Sanchez, Los Angeles; Balazs Becht, Granada Hills, all of Calif.

[73] Assignee: Tanner Electronics Systems Technology, Inc., Van Nuys, Calif.

[21] Appl. No.: 737,755

[22] Filed: Nov. 1, 1976

[51] Int. Cl.[2] .................. H04N 1/44; H01H 35/42; H01R 13/44
[52] U.S. Cl. .................. 358/118; 200/61.08; 339/37; 358/114; 361/399; 361/422
[58] Field of Search .............. 358/114, 118; 325/477; 361/399, 422; 200/61.08; 339/37; 340/280

[56] References Cited

U.S. PATENT DOCUMENTS

| 2,702,330 | 2/1955 | Levy | 200/61.08 |
|---|---|---|---|
| 2,905,747 | 9/1959 | Kidd et al. | 358/118 |
| 2,984,768 | 5/1961 | Henry | 361/422 |
| 3,202,758 | 8/1965 | Brownstein | 358/118 |
| 3,347,982 | 10/1967 | Bass et al. | 325/477 |
| 3,452,303 | 6/1969 | Babcock | 325/477 |
| 3,760,097 | 9/1973 | Burroughs et al. | 358/114 |
| 3,760,130 | 9/1973 | Ross et al. | 339/37 |
| 3,896,262 | 7/1975 | Hudspeth et al. | 358/118 |

Primary Examiner—S. C. Buczinski
Attorney, Agent, or Firm—Herzig & Walsh Incorporated

[57] ABSTRACT

A secured scramble decoder filter comprised of a narrow band filter assembled on a fragile substrate and mounted in a housing wich automatically destroys the filter when any tampering is attempted. The filter is a series tuned network bridging a conductor coupled through a capacitor to a parallel tuned network, which is connected to ground. The coils for the filter are printed on a special electronic glass tube for temperature stability while the capacitors are deposited on the fragile substrate. The filter is mounted in a sealed housing in brackets with a spring, loaded to break the substrate when the device is tampered with to render it inoperative. The device is provided with a mounting screw requiring a special tool for removal so that when the device is mounted any prying in an attempt to remove the device will trigger the destruction of the filter.

12 Claims, 13 Drawing Figures

SECURED SCRAMBLE DECODER FILTER

BACKGROUND OF THE INVENTION

This invention relates to security systems for television transmission and more particularly relates to a scramble decoding filter for removing an interfering signal which disrupts normal viewing of a television picture.

With the advent of pay television and particularly with the use of cable television many techniques have been proposed for preventing viewers from seeing a particular program unless they are subscribers. Many of these systems are complex, requiring sophisticated circuitry and active networks which increase their cost while reducing their effectiveness. These systems provide various means for disrupting the picture or in some cases actually interrupt transmission of the picture.

Injection of interfering signals and their removal by various means has been described by others. To date these systems have not been widely accepted because of their lack of security, reliability or expense. One system injects a signal in the vestigial side band while another uses two signals, one near the video and one near the audio to disrupt the viewing reception. After injecting these signals, the difficulty is in removing them without disturbing the normal transmission so that the picture will have no distortion or disturbance visible in it. Further, introduction of these interfering signals has in some cases caused unwarranted and unforeseen side effects. One such device, however, has solved some of these problems by using a single interfering signal strategically placed which can be removed with minimum effect on the viewer's picture and sound. This particular system is the subject of an application Ser. No. 697,507, filed June 18, 1976, by James L. Tanner and Bruno A. Rist.

In the prior filed application, an interference signal is inserted between the video carrier and the audio carrier of a television signal; the interfering signal is within the frequency range of one-quarter to three-quarters of the interval between the video carrier and the audio carrier.

Filters are well known in the art and have long been used in trapping interfering signals which disturb television viewing. However, in most cases these filters remove signals outside the band of the particular television signal and therefore do not significantly interfere with the video or audio portion of the transmission. However, these filters are typically wide band and cannot be adapted readily for use for removing interfering signals within the TV band. Filters known as band elimination filters are also available but they are either very expensive to manufacture or are very difficulty to keep in a reasonable stable condition. For this reason the applicants have invented a secure narrow band, very stable filter for use with the television security system described in the above-identified application, Ser. No. 697,507.

SUMMARY OF THE INVENTION

This invention relates to television security systems and more particularly relates to a narrow band filter for use with such a system which provides maximum security from tampering.

The narrow band filter of this invention is comprised of a highly stable, band elimination filter mounted on a frangible substrate which can be easily mounted in a housing for securing to a wall or baseboard. The filter has components which are specially constructed to make them very stable and reliable during operation. The coils for the filter are deposited or painted on tubular electronic temperature stable glass while coarse tuned capacitors are connected to deposit by a thick film process on the substrate. Trimmer capacitors are fastened to the substrate for fine tuning the filter to the final set frequency. The filter is designed to reject or attenuate a very narrow band with minimum drift from center frequency. That is, the frequency to be attenuated should remain stable over a long period of use at ambient temperatures. It is also important that the device be completely passive eliminating the need for any outside source of power.

In addition to being a highly stable notch filter the device must provide some degree of security to prevent tampering or removal. Thus, the filter is mounted in an enclosure which provides a screw for attaching to a wall or other solid surface. The screw has an unusual shaped socket so that the device cannot be removed except with a special tool. In addition, the device provides a destruct mechanism comprised of a spring loaded to be released when any attempt is made to pry the decoder from a wall. One variation of the destruct mechanism is a mechanism which allows only a single use of the decoder. That is, once it is attached to the wall it cannot be removed by prying or loosening of the screw without the destruct mechanism being actuated. This provides nearly complete security preventing anyone, in any way, from obtaining one of these devices by removing it once it is placed in position. The device is still constructed so that it may be removed but removal will result in destruction of the filter.

It is one object of the present invention to provide a narrow band filter which can be secured and is very stable.

It is another object of the present invention to provide a filtering device for a television security system which is completely passive.

Another object of the present invention is to provide a decoder filter for a television security system which remains stable at the particular frequency within predetermined limits.

Another object of the present invention is to provide a decoder filter for a television security system which will be destroyed if tampered with.

Still another object of the present invention is to provide a decoder for a television security system which is secured to destruct whenever removed from its mounting.

These and other objects of the invention will become apparent from the following detailed description of the invention when considered in conjunction with the accompanying drawings wherein like reference numbers identify like parts throughout.

DETAILED DESCRIPTION OF THE PREFERRED EMBODIMENT

Figure 1:
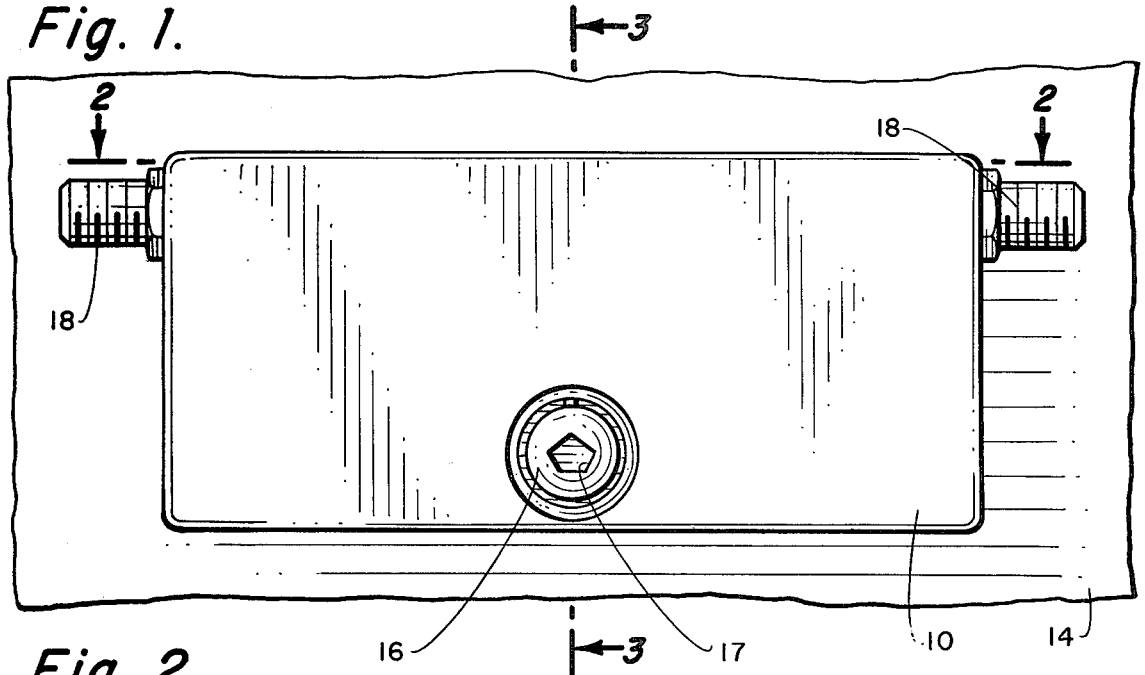
FIG. 1 is a side elevation illustrating the decoder attached to a solid surface.

Referring now to FIG. 1, a decoder or descrambling filter 10 is shown attached to a wall or other solid surface 14 by an unorthodox screw 16 which requires a special tool for removal. Cable connectors 18 permit connecting the decoder 10 in a drop line between a TV receiver and the outside cable.

Figure 4:
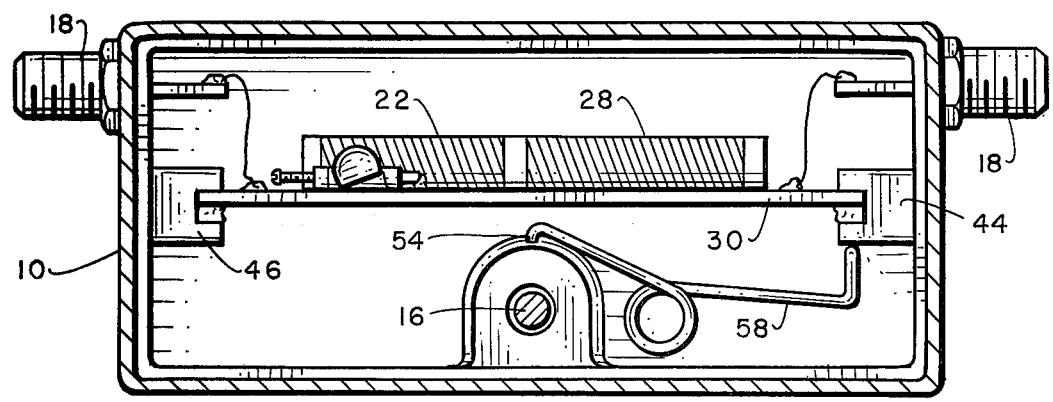
FIG. 4 is a sectional view of the decoder taken at 4—4 of FIG. 3.
Figure 5:
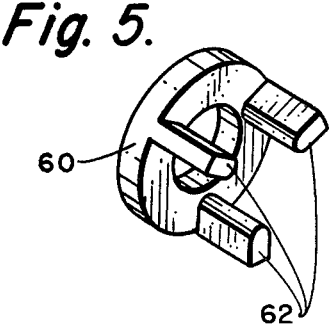
FIG. 5 is a detailed view of a crushable insert for use with the security system of the invention.

The construction of the filter is shown schematically in FIG. 5 and mechanically in the sectional views of FIGS. 2, 4, 8, 9 and 10. The filter is comprised of a series resonant circuit connected across a conductor 20 comprised of a coil L-1 and capacitor C-1 and C-2 in conjunction with a parallel resonant circuit comprised of coil L-2 in parallel with capacitors C-4 and C-5. The parallel resonant circuit is connected to the conductor 20 by a capacitor C-3. The plugs P-1 and P-2 correspond to the cable connectors 18 shown in FIG. 1.

Figure 6:
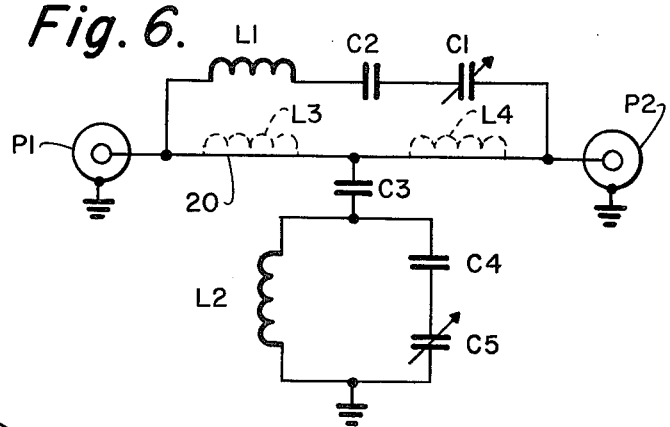
FIG. 6 is a schematic diagram of the electrical configuration of the filter of the decoder.

The filter schematic shown in FIG. 6 illustrates the preferred configuration of the band elimination filter for use with the TV security system. In this filter the conductor 20 at television frequencies acts as small inductances L-3 and L-4. These function with the series resonant circuit and parallel resonant circuit to provide the narrow band for removing the scramble signal from the video received through a cable or transmission.

Figure 2:
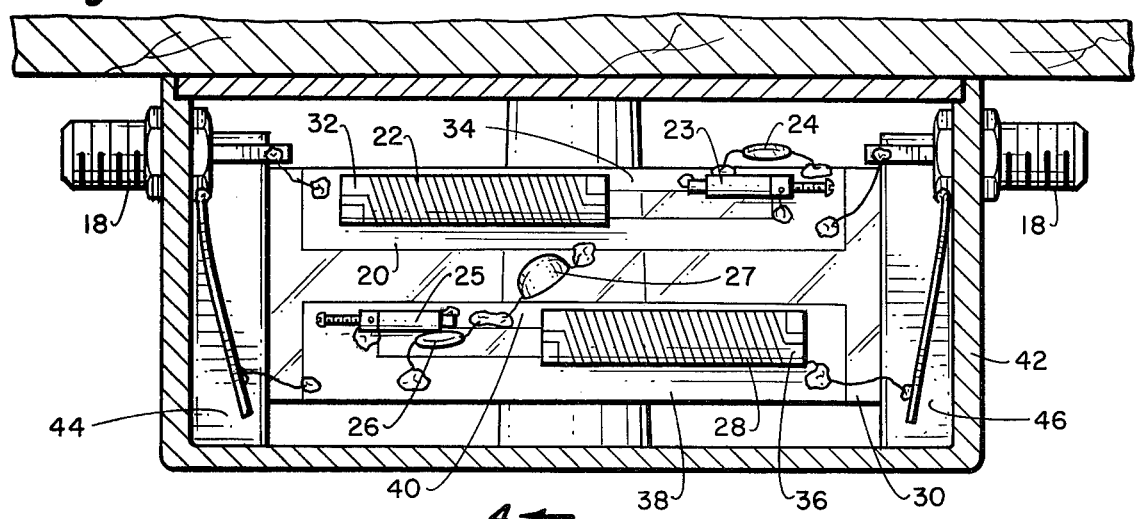
FIG. 2 is an internal view of the decoder filter of FIG. 1 showing the mounting of the band elimination filter.
Figure 11:
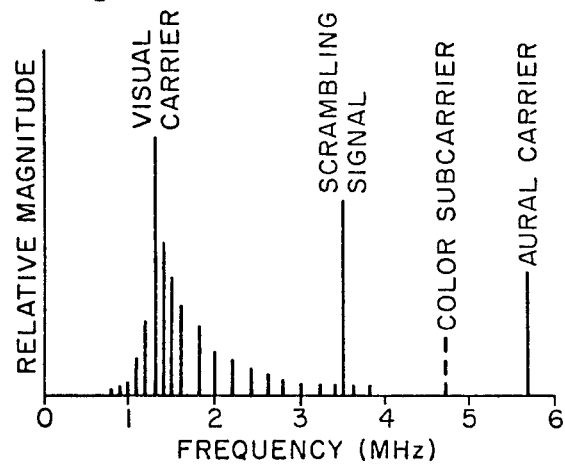
FIG. 11 comprises a graphical illustration of a typical television channel frequency spectrum with the interfering signal carrier added between the video and audio carriers.

For purposes of the invention and for use with the scrambling system of U.S. Pat. application Ser. No. 697,507, the filter is shown in FIG. 2 mounted on a frangible substrate 30 which can be fractured as a security measure, but also provides temperature stability. The conductor 20 between cable connectors 18 is a thin film coated on the substrate 30. Coil L-1 is shown at 22 and is comprised of a coil painted or deposited on a tubular temperature-stable glass member 32 attached at one end to conductor 20 and at the other end to a conductor 34 coated on the substrate 30. The adjustable capacitor C-1 is a small tunable capacitor 23 connected to conductive film 34 at one end and to capacitor 24 representing capacitor C-2 at the other end which in turn is connected to the conductor 20. The capacitor 23 permits the series resonant circuit to be finely tuned to the exact center frequency of the band to be eliminated. As shown in FIG. 11, the band to be eliminated is between the video and audio carrier signals. In the situation depicted, the interfering wave is substantially midway between the video and audio carriers; in particular applications of the invention, the interfering signal may be within a range of substantially one-quarter to three-quarters of the interval between the video and audio carriers.

Figure 3:
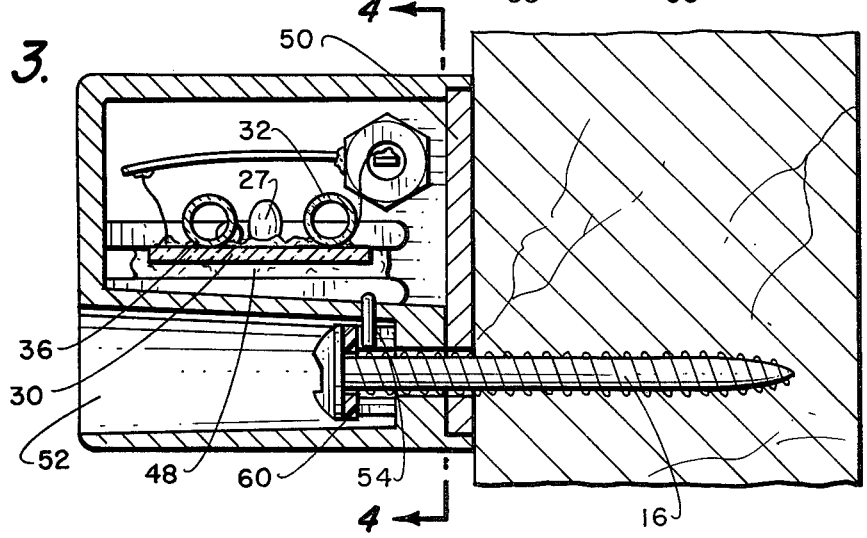
FIG. 3 is a sectional side view of the decoder of FIG. 1 taken at 3—3 of FIG. 1.

The parallel resonant circuit is comprised of the coil 28 ($L_2$) coated, deposited or painted on a temperature-stable glass tube 36 attached to a conductor strip 38 at one end and an additional conductor strip 40 at the other end. The parallel capacitors C-4 and C-5 are shown at 25 and 26 connected between the conductive strip 40 and the conductive strip 38. The capacitor 27 represents the capacitor C-3 connecting the parallel resonant circuit of coil 28 and capacitors 25 and 26 to the series resonant circuit of coil 22 and capacitors 23 and 24. The substrate 30 is mounted in the housing 42 by engaging slots in flanges 44 and 46 at each end of the housing and being fastened by a suitable epoxy 48, as shown in FIG. 3. After mounting of the filter on the substrate 30 and fastening or securing it in the housing 42, the housing is sealed with a plate 50.

A mounting hole 52 is cast in the housing 42 for attachment to the wall or other solid surface as shown in FIG. 1. This is accomplished by a single screw 16 which has an unorthodox socket 17 which only permits the device to be removed by use of a specially constructed tool.

In order to prevent tampering with a device a special destruct mechanism is provided. The destruct mechanism prevents the device from being removed from the wall without the special tool. The tamper-proof security system is shown in FIG. 3 and FIG. 4. A spring 58 has one end in a hole 54 in the wall of the mounting hole 52 extending into the cavity 52 beneath the head of the screw 16. The opposite end of the spring 58 rests on the flange 44 adjacent to the frangible substrate 30. A crushable spacer 60 beneath the head of the screw 16 prevents the screw from triggering the spring 60 when the decoder is being mounted to a wall. The spacer is constructed as shown in FIG. 4 and has legs 62 of a crushable material. In operation the device is mounted to a wall of solid surface as shown in FIG. 1 and cannot be removed, as previously described, except with a special tool. Any attempt to pry the device from a wall will cause the spacer 60 and its legs 62 to crush, triggering the spring 58, which in turn shatters the substrate 30, rendering the device useless. Thus, the device is secured against tampering and removal by a subscriber. However, the device can be removed by a special tool used by the installer or if one had the means to construct such a tool.

Figure 7A:
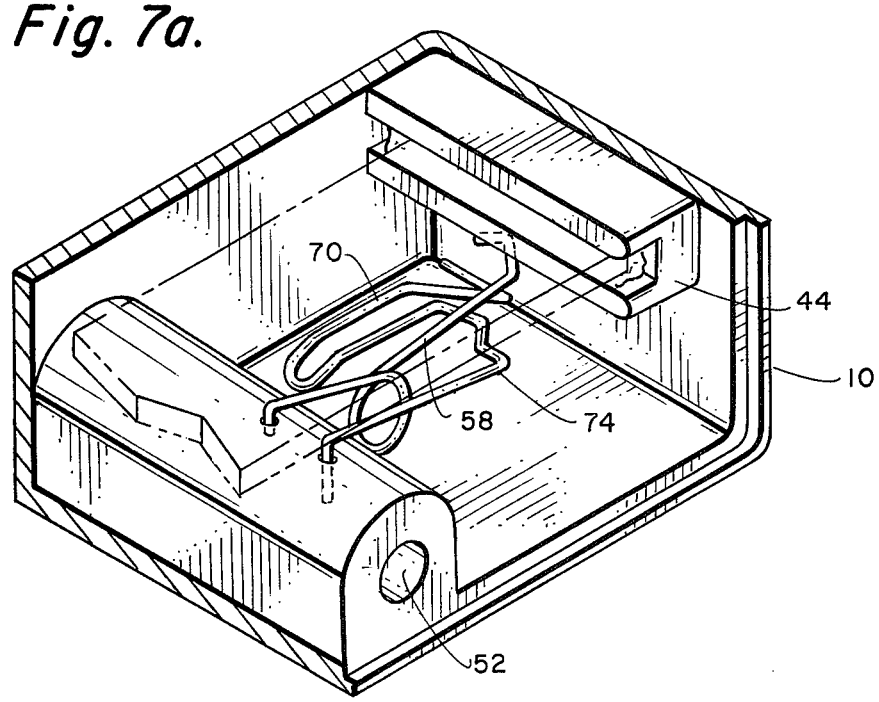
FIG. 7a is a partial section showing the destruct system before attachment of the decoder.
Figure 7B:
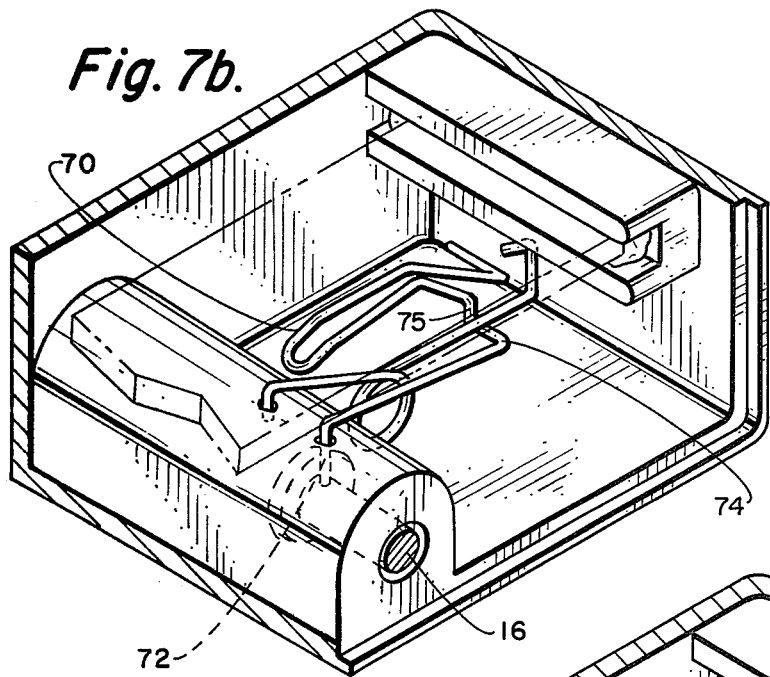
FIG. 7b is a partial section illustrating the one-time use destruct system in a cocked position.
Figure 7C:
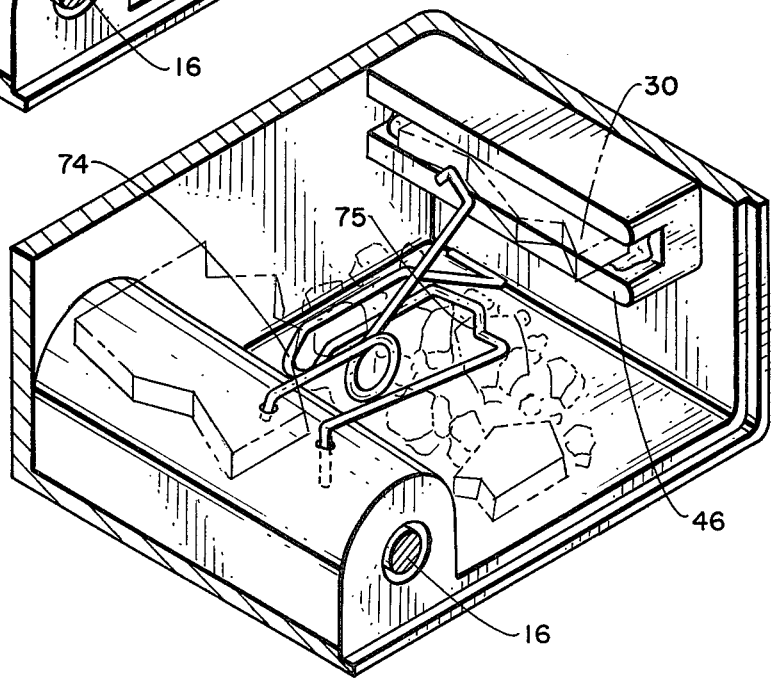
FIG. 7c is a partial section illustrating the destruction of the filter by triggering of the destruct mechanism.

For this reason the complete destruct system shown in FIGS. 7a through 7c is provided for those who wish to maintain the device in a permanently mounted and secured manner. These figures merely illustrate the operation of the device and therefore are only partial sections. In FIG. 7a the device is shown prior to mounting to a wall. The spring 58 again engages a hole in the wall of the mounting hole 52, except it does not extend into the cavity 52. The opposite end again rests upon the shoulder 44 with the arm resting on a second cocking spring 70. In this position the device is ready for mounting to a wall. When mounted, the head of the screw 16 will engage an end 72 FIG. 7b) of the cocking spring, causing the spring 58 to fall down onto the lower portion 74 of the cocking spring. The screw head engaging the end 72 of the spring 70 keeps the device from triggering. When any attempt is made to remove the decoder from the wall, loosening of the screw 16 releases the spring 70 and the vertical section 75 of the spring pushes the first spring 58 off the shoulder shattering the frangible substrate. Thus, this mounting system is for a one-time use only. Any removal automatically destroys the filter decoder and prevents any further use.

Figure 8:
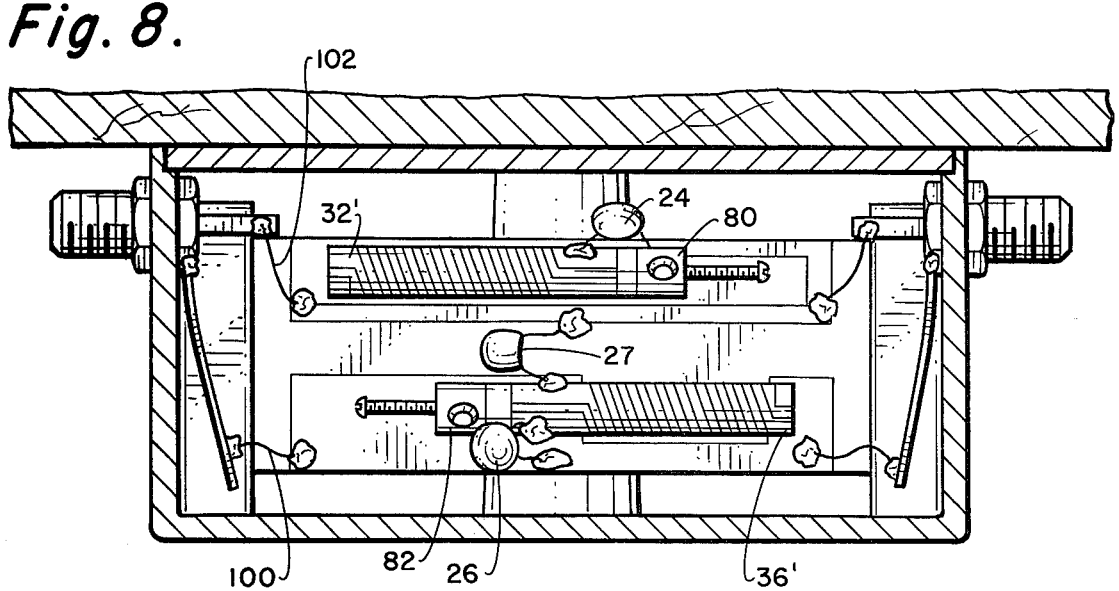
FIG. 8 is a sectional view of the decoder filter taken at 2—2 of FIG. 1 illustrating another embodiment.
Figure 9:
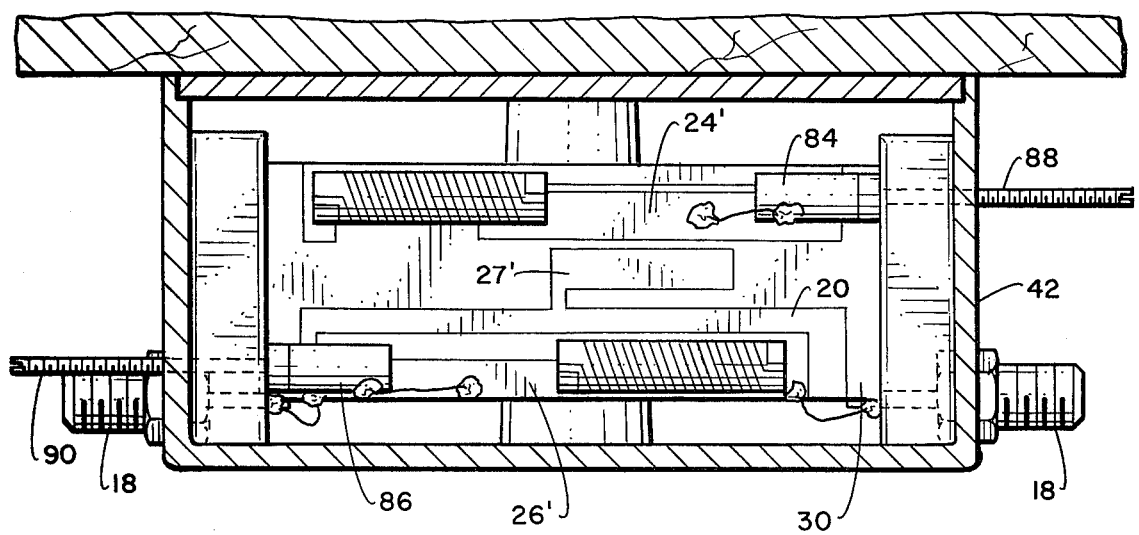
FIG. 9 is another sectional view of the decoder of FIG. 1 taken at 2—2 illustrating a third embodiment of the invention.
Figure 10:
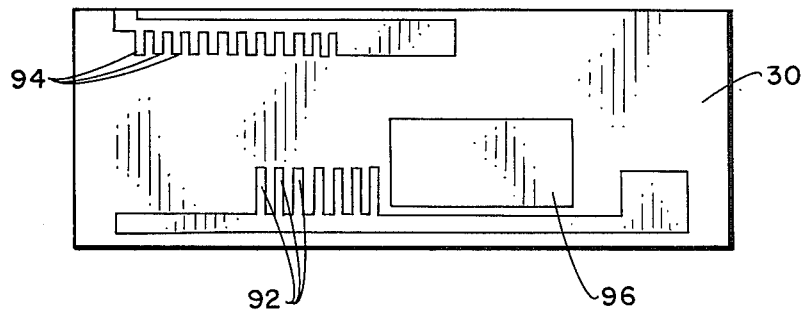
FIG. 10 is another embodiment illustrating an alternate filter construction.

Since different channels require different frequencies for the filter decoders, variations in the construction, which can simplify and improve critical alignments, are shown in FIGS. 8, 9 and 10. In FIG. 8 the filter is substantially the same as shown in FIG. 2, except the variable or adjustable trimming capacitor C-1 and C-5 are provided as a screw attachment to the end of the tubular coils 32' and 36'. That is, conductive material is coated or deposited on the opposite end of the temperature-stable glass tube and a fitting 80 is attached to the glass tubes for adjusting the screw for changing the capacitance. Capacitors 24, 26 and 27 are fixed capacitors similar to the manner shown at 52.

Another embodiment is illustrated in FIG. 9. In this embodiment the conductor 20 is shown with the capacitor 27' representing capacitor C-3 being provided by a thick film process on the frangible substrate 30. Capacitors 24 and 26' are also provided by a thick film process on the frangible substrate. The variable or trimmer capacitors C-1 and C-5 are provided by capacitors 84 and 86 secured to the housing 42 with adjustable screws 88 and 90 extending through the wall of the housing 42. This configuration permits the trimmer capacitor C-1 and C-5 to be more easily adjusted after the housing has been sealed.

Another variation is shown in FIG. 10 in which the frangible substrate 30 is provided as before with the capacitors C-2 and C-4 being provided as a number of discrete strips 92 and 94 thick filmed on the substrate. The capacitor C-3 is also provided as a thick film 96 on the substrate. The plurality of strips representing the capacitor C-2 and C-4 allow for coarse tuning of the filter after mounting in the housing 42, but prior to sealing. This is done by etching away parts of a strip or portions of all the strips. The substrate used throughout these various decoders may be glass of Alumina.

Thus, there has been disclosed a filter decoder for use with a TV security system which provides security from tampering and a mechanical construction which maintains the electrical stability of the filter around the desired frequency. In some cases it might not be necessary to utilize a frangible substrate 30 but a printed circuit, if the stability and security can be maintained. For this type of configuration, the destruct mechanism can be provided to either seriously damage a component in the filter or break a connecting conductor. For example, the connecting wires 100 between the ground or the wire 102 to the plug can be arranged to be severed by the spring.

Obviously, many modifications and variations of the present invention are possible in light of the above teachings. It is therefore to be fully understood that the full scope of the invention is not limited to the details disclosed herein and may be practiced otherwise than as specifically described.

What is claimed is:

1. A circuit device for removing an interfering signal purposely injected between the video carrier and audio carrier of a television transmission signal, said interfering signal having a frequency substantially in the range of one-fourth to three-fourths of the frequency interval between the video carrier and the audio carrier comprising:
    a housing;
    a narrow band notch filter mounted in said housing;
    means for tuning said filter to the optimum frequency for eliminating the interfering signal, the latter having a frequency substantially in the range of one-fourth to three-fourths of the frequency interval between the video carrier and the audio carrier; and
    means for mounting said housing, said mounting means including means for securing said filter against unauthorized removal from said mounting.

2. The circuit device according to claim 1 wherein said filter comprises:
    a series resonant inductance and capacitance circuit; and
    a parallel resonant inductance and capacitance circuit.

3. The circuit device according to claim 2 wherein said means for tuning the filter comprises:
    a tunable capacitor in said series and said parallel resonant circuits.

4. The circuit device according to claim 1 further including breakable mounting means in said housing, said narrow band notch filter being mounted upon said breakable mounting means and wherein said means for securing said filter comprise:
    means for breaking said breakable mounting means when said device is tampered with.

5. The circuit device according to claim 2 wherein said narrow band notch filter is mounted on a substrate and further including a temperature stable glass member mounted upon said substrate, said inductances of said series and parallel resonant circuits being mounted upon said stable glass member.

6. The circuit device according to claim 2 wherein said means for tuning said filter comprises:
    means for tuning said series and parallel inductances.

7. The circuit device according to claim 3 wherein said means for tuning said filter further includes;
    depositing at least one capacitor for the series and parallel resonant circuits on a temperature stable substrate;
    depositing the filter conductors on said substrate;
    said deposited capacitors including means for coarse tuning said filter.

8. A circuit device for removing an interfering signal purposely injected between the video and audio of a television transmission comprising:
    a housing;
    a frangible substrate mounted in said housing;
    a narrow band notch filter mounted in said housing upon said frangible substrate;
    tuning means for tuning said filter to the optimum frequency for eliminating the interfering signal;
    mounting means for mounting said housing containing said filter;
    said mounting means including breaking means for breaking said frangible substrate when said device is tampered with, the breaking means comprising a spring, means for cocking said spring, and means for triggering said spring whereby said spring breaks said frangible substrate rendering said filter inoperative.

9. The circuit device according to claim 8 wherein said spring for breaking said breakable mounting means comprises:
    a coil spring having one end resting on a shelf in said housing; the other end of said spring extending into a cavity adjacent to the head of a special mounting screw;

whereby said mounting screw head will trigger said spring if an attempt is made to forcibly remove said housing from its mounting.

10. The circuit according to claim 9 including;

spacer means beneath said screw head for preventing triggering of said spring during mounting;

said spacer means having crushable legs for triggering said spring by said screw head when a predetermined force is applied to said housing.

11. The circuit device according to claim 8 wherein;

said triggering means comprises a second cocking spring beneath the first spring;

said cocking spring being biased by the head of a screw for mounting said housing;

said cocking spring triggering said first spring whenever the housing is removed from its mounting whereby said filter device will be rendered inoperative if removed from its mounting by any means.

12. A circuit device for removing an interfering signal purposely injected between the video and the audio of a television transmission comprising:

a housing;

a narrow band notch filter mounted in said housing, said filter comprising a series resonant inductance and capacitance circuit and a parallel resonant inductance and capacitance circuit, conductors for said filter being deposited upon a substrate;

tuning means for tuning said filter to the optimum frequency for eliminating the interfering signal, said tuning means comprising tunable capacitor means in said series and said parallel resonant circuits, said tunable capacitor means comprising at least one capacitor for the series and parallel resonant circuits, said at least one capacitor being deposited upon a temperature stable member attached to said substrate, said at least one capacitor comprising a plurality of strips deposited upon said substrate and being coarse tunable by removal of all or a portion of said strips.

* * * * *